United States Patent Office 3,423,336
Patented Jan. 21, 1969

3,423,336
WEAK BASE ANION EXCHANGE RESIN AND
PROCESS OF PREPARING SAME
Richard G. Bufton, San Jose, Irving M. Abrams, Redwood City, and Frederick L. Burnett III, Sunnyvale, Calif., assignors to Diamond Shamrock Corporation, a corporation of Delaware
No Drawing. Filed Oct. 18, 1965, Ser. No. 497,528
U.S. Cl. 260—2.1                                     24 Claims
Int. Cl. C08f 27/14; C08f 1/84; C08f 27/08

ABSTRACT OF THE DISCLOSURE

Weak base anion exchange resins are prepared by cross-linking a polymerizable unsaturated nitrile with a compound containing at least two polymerizable unsaturated groups. The nitrile groups may be converted into imide groups by hydrolyzing the nitrile group to carboxylic groups followed by reacting with an anhydrous alkylene polyamine. The nitrile groups also may be converted into imidazole groups by reacting the base resin with an ortho aromatic diamine under anhydrous conditions in the presence of hydrogen sulfide. The exchange capacity of these resins is quite stable in strongly acidic environment.

---

This invention relates to ion exchange resins, and more particularly to a novel series of weak-base anion exchange resins derived from polymerizable unsaturated nitriles.

Weak-base anion exchange resins in general use at the present time are principally of three types. The first of these consists of aminated phenol-formaldehyde and amino-formaldehyde resins, as described in U.S. Patent No. 2,290,345. The second group comprises chloromethylated and aminated styrene-divinylbenzene resins, as described in U.S. Patent No. 2,591,574. The third group is formed by cross-linking aliphatic amines with compounds such as epichlorohydrin or glycerol dichlorohydrin, as described in U.S. Patent No. 2,469,694.

D'Alelio, in U.S. Patent No. 2,697,079, has disclosed a fourth variety of weak-base anion exchange resin which is formed by copolymerizing an unsaturated nitrile, such as acrylonitrile, with a cross-linking agent, such as divinylbenzene, and then reducing the nitrile groups in the thus-formed resin to amine groups by hydrogenation over a catalyst such as platinum or Raney nickel. Because of the high cost of the catalyst used in the hydrogenation step, this resin is expensive to make and is not in wide use.

The present invention is directed to a series of weak-base anion exchange resins which may be easily and relatively inexpensively prepared, and which have a variety of properties rendering them useful in a number of different fields and for a wide range of applications. In general, the resins of this invention consist of a cross-linked polymeric matrix obtained by copolymerizing a polymerizable unsaturated nitrile with a cross-linking compound containing at least two polymerizable unsaturated groups, and attached to said polymeric matrix substituent anion-active radicals selected from the group consisting of

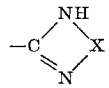

wherein X is a divalent ortho aromatic radical, and

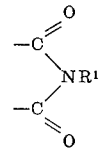

wherein $R^1$ is selected from the group consisting of aminoalkyl and amino-aza-alkyl wherein the alkyl radical contains about 2 to 12, preferably 2 to 6, carbon atoms. More specifically, the present invention includes a base resin matrix containing anion-active substituents which may be identified as "imide" and imidazole as dsecribed hereinafter.

BASE RESIN

The base resin used for the preparation of the anion exchange resins of the present invention is prepared by copolymerizing an unsaturated nitrile with an aliphatic or aromatic cross-linking agent containing at least two polymerizable unsaturated groups. Examples of suitable nitriles are acrylonitrile, methacrylonitrile, vinyl benzyl cyanide and the like with acrylonitrile and methacrylonitrile being preferred. Examples of suitable cross-linking agents include ethylene glycol dimethacrylate, divinylbenzene, divinyltoluene, trivinylbenzene and the like, and also mixtures of such compounds with similar monovinyl materials, such as ethylvinylbenzene. The cross-linking comonomer should comprise about 1–40% and preferably about 5–20% of the total monomer weight. Alternatively, linear polyacrylonitrile may be employed in place of the usual acrylonitrile cross-linked copolymer to prepare the anion resins. By using a polyamine, such as diethylene triamine, as the reactant the reaction of both the terminal amine groups on the one polyamine molecule serves to tie separate chains of the homopolymer together, thus resulting in a cross-linked resin. The product would have weak-base anion exchange capacity because of the remaining unreacted secondary amine group in each diethylene triamine molecule.

Any polymerization method that will provide a suitable granular product may be used. In a preferred embodiment of the invention, the reaction is carried out in aqueous suspension. For this purpose, the monomeric reactants are charged to an aqueous medium containing suitable dispersing agents and a polymerization catalyst, such as dibenzoyl peroxide, benzoyl hydroperoxide, diacetyl peroxide, dichlorobenzoyl peroxide, di-t-butyl peroxide, butyl hydroperoxide, cyclohexanone peroxide, methyl ethyl ketone peroxide, dilauroyl peroxide or azobisisobutyronitrile. The reaction mixture is vigorously agitated and is maintained at a temperature of about 25–100° C., preferably about 45–70° C., as polymerization takes place. The polymerization product is obtained in the form of discrete granules.

It has been found that when the polymerization reaction is carried out in the presence of a plasticizer, the product has superior properties including macroporosity, increased physical strength and better resistance to sudden changes in pH. The plasticizer is added to the monomer mixture in an amount equal to approximately 5–30% preferably about 10–20%, of the monomer weight. Suitable plasticizers include, for example, dioctyl phthalate, dioctyl sebacate, diisooctyl sebacate, dioctyl azelate and diisodecyl phthalate and the like with diisodecyl phthalate being preferred.

While the preferred base resins are those prepared from acrylonitrile or methacrylonitrile and divinylbenzene as described hereinabove, other types of base resins may also be used. For example, chloromethylated polystyrene, cross-linked with divinylbenzene or with methylene bridges as described in U.S. Patent 2,900,352, may be reacted with sodium cyanide to form a polyvinylbenzonitrile resin. Other suitable matrix resins will be apparent to those skilled in the art.

"IMIDE" RESIN

A weak base "imide" resin may be obtained by hydrolyzing the base resin, thus converting the nitrile groups to carboxylic acid groups, and reacting the hydrolyzed resin with an anhydrous alkylene polyamine. Alternatively, it may be prepared by copolymerizing an unsaturated acid such as acrylic acid or an ester thereof, with a cross-linking comonomer and treating the copolymer thus formed directly with the amine. However, it is generally more convenient to polymerize the nitrile-containing monomer than the carboxylic acid or ester. The base resin may be hydrolyzed in either acid or alkaline solution, but the reaction is most conveniently carried out in concentrated mineral acid solution, such as 60% sulfuric acid. Temperatures of about 100–180° C. are preferred.

Suitable amines which may be used according to the present invention include, in general, polyfunctional primary and secondary aliphatic amines containing about 2 to 12, preferably 2 to 6 carbon atoms. Typical examples are diethylene triamine, 1,6-diaminohexane, bis(hexamethylene)triamine, diethyl aminopropylamine, bis(trimethylene)triamine and the like. Additional cross-linking through the polyamine groups possibly may occur as indicated hereinabove.

The reaction between the hydrolyzed base resin and the amine is carried out in a suitable inert, high-boiling liquid medium. Diphenyl ether is a preferred solvent, but other ethers, hydrocarbons and the like may be used. For the preparation of imide resins, the amine is used in its anhydrous state rather than with water. The molar ratio of amine to base resin (on an acrylonitrile basis) is between about 2.5:1 and 1:4, preferably about 1:1 (half that used to prepare an "amide" resin). The reaction is carried out at a temperature of about 100° to about 300° C. It is believed that the resins produced by this method contain substituent radicals having the structure:

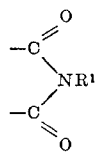

wherein $R^1$ is aminoalkyl or, preferably, amino-aza-alkyl, such as $R^2NHR^2NH_2$, $R^2$ being alkylene containing about 2 to 12, preferably 2 to 6 carbon atoms. That is, adjacent carboxylic acid groups in the base resin react with the polyamine to form a cyclic imide moiety.

The "imide" resins of this invention have a lower weak-base capacity than do the acrylonitrile-derived "amide" and "amidine" resins disclosed in copending patent application Ser. No. 497,527, filed of even date herewith; but their stability in a strongly acidic environment is substantially greater. Therefore, they are particularly useful under more severe conditions than the acrylonitrile derived "amide" and "amidine" resins.

"IMIDAZOLE" RESIN

Weak-base resins with substituent groups of the structure

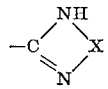

wherein X is a divalent ortho aromatic radical, are obtained by reacting the base resin with an ortho aromatic diamine such as O-phenylenediamine (which is preferred) or 2,3-naphthylenediamine or a substituted derivative thereof. The reaction is carried out under anhydrous conditions at a temperature of about 100–300° C., in the presence of a hydrogen sulfide catalyst and a high-boiling nonreactive liquid, preferably a paraffinic or aromatic hydrocarbon or a nonvolatile ether such as diphenyl ether. The resulting resin is highly resistant to hydrolysis and oxidation.

EVALUATION OF RESINS

The most commonly used index of an ion exchange resin's performance is its capacity. Capacity, usually expressed in equivalents per liter, is (for a weak-base anion exchange resin) a measure of the amount of acid which a given volume of resin in the free-base form will neutralize. It is measured by regenerating the resin with excess base and rinsing the regenerated resin with water, and then passing therethrough an excess of a standard acid (usually hydrochloric acid) solution. The effluent is titrated with standard base to determine the amount of acid, expressed in terms of milliequivalents, adsorbed by the resin.

Because of incomplete reaction there may be some free carboxylic acid groups in the resins of this invention which are detrimental to their use as weak-base resins. It is necessary, therefore, to measure the carboxylic acid capacity of the resin as well as its weak-base capacity. Carboxylic acid capacity is measured by titrating an accurately measured aliquot of the effluent with standard silver nitrate solution. From the sodium hydroxide titer, determined in the measurement of weak-base capacity, can be obtained the amount of hydrochloric acid in the effluent. The silver nitrate titer is proportional to the volume of total chlorides in the effluent, and from these two figures can be determined the amount of chloride resulting from sodium chloride. Since any sodium ion in the effluent must be the result of the elution of sodium ions held by carboxylic acid groups on the resin, the carboxylic acid capacity of the resin may be thus determined. This capacity is a direct measure of the degree of decomposition of the resin by hydrolysis. The most desirable resins are those which have high weak-base capacities and low carboxylic acid capacities.

Hydrolytic stability of a resin of this invention is evaluated by refluxing the resin with 6 N hydrochloric acid overnight. Following this treatment, total capacity and carboxylic acid capacity are again measured.

Example 1.—Preparation of acrylonitrile-divinylbenzene base resin

A three-necked flask, fitted with a stirrer and immersed in a water bath at 60° C., is charged with 1250 ml. of water, 420 grams of sodium chloride and 2.5 grams of Natrosol 250, a nonionic water-soluble cellulose ether dispersant. The stirrer is started and a mixture of 395 grams of acrylonitrile, 84.5 grams of divinylbenzene (55.5% in ethylvinylbenzene) and 3 grams of dibenzoyl peroxide is added. Polymerization occurs as the mixture is stirred at 65° C. over a 16-hour period. At the end of this time, the mixture is cooled and the copolymer beads are separated by filtration and air-dried.

Example 2.—Preparation of acrylonitrile-divinylbenzene base resin with plasticizer The procedure of Example 1 is followed except that 81.5 grams of diisodecyl phthalate is combined with the acrylonitrile-divinylbenzene benzoyl peroxide mixture. The resulting polymer beads have greater strength and porosity than those prepared by the method of Example 1. Porosity is measured by the adsorption of large molecules from an aqueous solution by the anion exchange resins from the various polymers under consideration.

Example 3.—Preparation of methacrylonitrile-divinylbenzene base resin

A three-necked flask, fitted with a stirrer, nitrogen inlet and condenser set downward for distillation, is charged with 175 ml. of water, 58.2 grams of sodium chloride and 0.35 gram of Natrosol 250 dispersant. Stirring is started and a mixture of 75 ml. (0.895 mole) of methacrylonitrile, 9.25 ml. of diisodecyl phthalate, 10.7 ml. of 58.8% divinylbenzene and 0.36 gram of benzoyl peroxide is added. The mixture is stirred vigorously under nitrogen at 70° C. for 16 hours. The resin beads thus obtained are washed with hot water, rinsed with methanol and dried.

Example 4.—Preparation of "imide" resin based on acrylonitrile-divinylbenzene resin A mixture of 133 grams (1.13 mole) of the acrylonitrile-divinylbenzene base resin prepared according to Example 2 is heated under reflux with 425 ml. of 60% aqueous sulfuric acid overnight with stirring. The product is washed with water and dried, and 10.2 grams (100 milliequivalents) thereof is placed in a three-necked flask fitted with a stirrer and reflux condenser. To the flask is added 8.22 grams (0.08 mole) of diethylene triamine and 150 ml. of diphenyl ether. The reaction mixture is heated at 140° C. for 16 hours, after which the condenser is set downward for distillation and heating is continued for 16 hours at 250° C. The resin is washed free of reactants and dried.

The weak-base capacity of the resin made according to the above procedure is 100 milliequivalents and the silver nitrate capacity is negligible. Upon hydrolysis with 6 N hydrochloric acid overnight at reflux temperature the resin is found to have 82 milliequivalents of weak-base capacity and 18 milliequivalents silver nitrate capacity.

Example 5.—Preparation of "imide" methacrylonitrile-divinylbenzene resin

The methacrylonitrile-divinylbenzene base resin of Example 3 is hydrolyzed with 60% aqueous sulfuric acid and the hydrolyzed resin is reacted with diethylene triamine according to the method of Example 4. A sample of the resulting anion exchange resin has a weak-base capacity of 79 milliequivalents and a silver nitrate capacity of 21 milliequivalents. After hydrolysis with 6 N hydrochloric acid, th weak-base capacity of the resin is 95 milliequivalents and the silver nitrate capacity is 38 milliequivalents.

Example 6.—Preparation of "benzimidazole" resin based on acrylonitrile-divinylbenzene resin A mixture of 39.9 grams (0.3 mole) of the acrylonitrile-divinylbenzene base resin of Example 2, 150 ml. of diphenyl ether and 35.7 grams (0.33 mole) of o-phenylenediamine is placed in a three-necked flask and dry hydrogen sulfide is passed through the mixture for 4 hours at 140° C. At the end of this time, the flask is fitted with a condenser set downward for distillation and is heated at 250° C. overnight. The product resin beads are washed with acetone, dilute sodium hydroxide, dilute hydrochloric acid, water and methanol. A sample of the resin has a weak-base capacity of 100 milliequivalents and an immeasurably small silver nitrate capacity. After hydrolysis with 6 N hydrochloric acid, it has a weak-base capacity of 95 milliequivalents and a silver nitrate capacity of 6.7 milliequivalents.

It is to be understood that the invention is not limited by the specific examples and embodiments described hereinabove, but includes such changes and modifications as may be apparent to one skilled in the art upon reading the appended claims.

What is claimed is:

1. A weak base anion exchange resin consisting of a cross-linked polymeric matrix obtained by copolymerizing a polymerizable unsaturated nitrile selected from the group consisting of acrylonitrile, methacrylonitrile and vinylbenzyl cyanide with a compound selected from a group consisting of ethylene glycol dimethacrylate, divinylbenzene, divinyltoluene, trivinylbenzene and mixtures thereof with ethylvinylbenzene wherein the nitrile groups of the matrix have been converted to substituent anion-active radicals having the formula

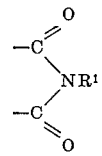

wherein $R^1$ is selected from the group consisting of amino-alkyl and amino-aza-alkyl.

2. An anion exchange resin according to claim 1 wherein the polymeric matrix contains a plasticizer which is an alkyl ester of a dicarboxylic acid.

3. An anion exchange resin according to claim 1 wherein the polymeric matrix is obtained by copolymerizing acrylonitrile with divinylbenzene.

4. An anion exchange resin according to claim 1 wherein the polymeric matrix is obtained by copolymerizing methacrylonitrile with divinylbenzene.

5. An anion exchange resin according to claim 1 wherein $R^1$ is —$R^2NHR^2NH_2$, and wherein $R^2$ is alkylene.

6. An anion exchange resin according to claim 5 wherein $R^2$ is an ethylene radical.

7. An anion exchange resin according to claim 5 wherein $R^2$ is a propylene radical.

8. An anion exchange resin according to claim 5 wherein $R^2$ is a hexylene radical.

9. An anion exchange resin according to claim 1 wherein $R^1$ is an aminoalkyl radical.

10. An anion exchange resin according to claim 9 wherein the aminoalkyl radical contains 6 carbon atoms.

11. A method for the preparation of a weak-base anion exchange resin according to claim 1 which comprises (1) copolymerizing, in aqueous suspension, a polymerizable unsaturated nitrile selected from the group consisting of acrylonitrile, methacrylonitrile and vinylbenzyl cyanide with a compound selected from the group consisting of ethylene glycol dimethacrylate, divinylbenzene, divinyltoluene, trivinylbenzene and mixtures thereof with ethylvinylbenzene, said compound comprising about 1–20% of the total monomer weight; (2) hydrolyzing the nitrile groups on the resin thus formed to carboxylic acid groups; (3) drying the hydrolyzed resin; and (4) reacting the hydrolyzed resin with an anhydrous alkylene polyamine selected from the group consisting of diethylene triamine, 1,6-diaminohexane, bis(hexamethylene)triamine, diethyl aminopropylamine and bis(trimethylene)triamine in an inert, high-boiling organic liquid medium at a temperature of about 100° to 300° C.

12. The method of claim 11 wherein an alkyl ester of a dicarboxylic acid is present as a plasticizer in the monomer mixture of step (1).

13. The method of claim 11 wherein step (2) is carried out in concentrated mineral acid solution.

14. The method of claim 11 wherein the aliphatic polyamine is diethylene triamine.

15. The method of claim 11 wherein the polymerizable nitrile is acrylonitrile and the aromatic compound is divinylbenzene.

16. The method of claim 11 wherein the nitrile is methacrylonitrile and the aromatic compound is divinylbenzene.

17. A weak base anion exchange resin consisting of a crosslinked polymeric matrix obtained by copolymerizing a polymerizable unsaturated nitrile selected from the group consisting of acrylonitrile, methacrylonitrile and vinylbenzyl cyanide with a compound selected from the group consisting of ethylene glycol dimethacrylate, divinylbenzene, divinyltoluene, trivinylbenzene and mixtures thereof with ethylvinylbenzene, wherein the nitrile groups of the matrix have been converted to substituent anion-active radicals having the formula

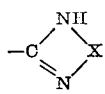

wherein X is a divalent ortho aromatic radical.

18. An anion exchange resin according to claim 17 wherein the polymeric matrix contains a plasticizer which is an alkyl ester of a dicarboxylic acid.

19. An anion exchange resin according to claim 17 wherein the polymeric matrix is obtained by copolymerizing acrylonitrile with divinylbenzene.

20. An anion exchange resin according to claim 17 wherein the polymeric matrix is obtained by copolymerizing methacrylonitrile with divinylbenzene.

21. An anion exchange resin according to claim 17 wherein X is o-phenylene.

22. A method for the preparation of a weak-base anion exchange resin according to claim 17 which comprises: (1) copolymerizing in aqueous suspension, a polymerizable unsaturated nitrile selected from the group consisting of acrylonitrile, methacrylonitrile and vinylbenzyl cyanide with a compound selected from the group consisting of ethylene glycol dimethacrylate, divinylbenzene, divinyltoluene, trivinylbenzene and mixtures thereof with ethylvinylbenzene, said compound comprising about 1–20% of the total monomer weight; and (2) reacting the resin thus formed with an ortho aromatic diamine under anhydrous conditions at a temperature of about 100° to 300° C. in the presence of hydrogen sulfide and a high-boiling, non-reactive organic liquid medium.

23. The method of claim 22 wherein an alkyl ester of a dicarboxylic acid is present as a plasticizer in the monomer mixture of step (1).

24. The method of claim 22 wherein the ortho aromatic diamine is o-phenylenediamine.

References Cited

UNITED STATES PATENTS

| | | | |
|---|---|---|---|
| 2,582,194 | 1/1952 | Dudley | 260—78 |
| 2,883,349 | 4/1959 | Tsunoda et al. | 260—2.1 |
| 3,311,572 | 3/1967 | Storey et al. | 260—2.1 |

OTHER REFERENCES

Wright: Chem. Rev. 48, 397–541 (1951), page 431 relied on.

Penn: High Polymeric Chemistry, London, Chapman & Hall Ltd., 1949 (p. 168).

Billmeyer: Textbook of Polymer Science, New York, Interscience, 1962 (p. 404).

Helfferich: Ion Exchange, New York, McGraw-Hill, 1962 (pp. 100 and 101).

WILLIAM H. SHORT, *Primary Examiner.*

M. GOLDSTEIN, *Assistant Examiner.*

U.S. Cl. X.R.

260—78, 85.5, 31.8, 93.5